INVENTOR:
Lawrence Burns 3,014,873
ELECTROLUMINESCENT PHOSPHORS
Laurence Burns, Swampscott, Mass., assignor, by mesne assignments, to Sylvania Electric Products Inc., Wilmington, Del., a corporation of Delaware
Original application Aug. 20, 1952, Ser. No. 305,400, now Patent No. 2,755,406, dated July 17, 1956. Divided and this application June 29, 1956, Ser. No. 594,742
3 Claims. (Cl. 252—301.4)

This invention relates to electroluminescent lamps, that is to lamps using phosphors which luminesce when placed in an electric field.

The phosphor in such lamps is suspended or embedded in a solid or liquid dielectric medium, placed between two electrodes, one of which is transparent. I find that the dielectric medium can be substantially eliminated if the powdered phosphor particles are pressed together directly between two electrodes, between which a voltage can be applied.

The elimination of the embedding dielectric medium reduces the possibility of electrical breakdown in the dielectric, and permits the use of higher applied field strengths. Fields between $16^6$ and $10^7$ volts/cm. can then be applied, which tend to increase the efficiency. In particular, the high field enables the excitation of electrons directly to the excited activator levels in the phosphor, from which they emit light on return. The electron does not have to be raised to the conduction band and then accelerated to an energy sufficient to excite an atom by collision or the like. The losses consequent to the electron's travel through the phosphor are thereby avoided, with consequent improved efficiency.

To achieve such a result, the activator should be a substance which can be raised to a level sufficient for light emission on return, but below the bottom level of the conduction band, and should be a substance in which direct excitation of an electron to the conducting band is of lower probability. A manganese activator in zinc sulphide fulfills the above requirements, for example.

Field strengths much lower than those mentioned above are insufficient to excite the activator atom directly to a light-emitting level. In phosphors intended for use with lower fields, an additional activator such as copper has to be used, to provide electrons in the conduction band which can be accelerated to excite the manganese activator. This aceleration, however, with consequent travel of the electrons through the crystal, introduces losses to the main lattice material of the crystal.

By using fields high enough to cause excitation of the activator to an intermediate level, but not high enough to excite many electrons to the conduction band, such losses can be greatly reduced and the efficiency of the crystal thereby improved.

Figure 1:
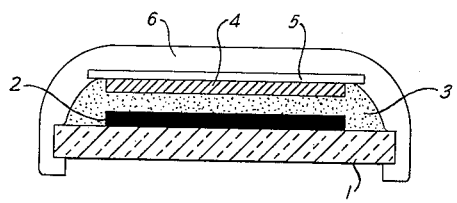
Figure 2:
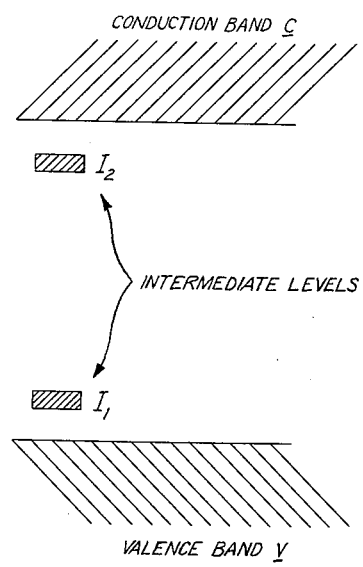

Other features, objects and advantages of the invention will be apparent from the following specification, taken in connection with the accompanying drawings which:

FIG. 1 is a cross-sectional view of one embodiment of the invention; and FIG. 2 is a schematic diagram of energy levels in one embodiment of an electroluminescent phosphor of the invention.

In FIG. 1, the glass plate 1 has the light-transmitting, electrically-conductive coating 2, over which is the compressed layer 3 of powdered electroluminescent phosphor, with the metal backing layer 4 thereover. A mica piece 5 is placed over the metal layer 4, and extends beyond the edges thereof to protect the phosphor layer 3. A layer 6 of plastic or ceramic material encloses the back of the device and is sealed to the glass plate 1 around the edges of the latter.

The phosphor powder of the layer 3 is made by mixing zinc sulfide with manganese carbonate as powders, in the proportion of about 0.005 mole of the manganese carbonate to one mole of the sulfide. The addition of a small amount of zinc oxide, say about 0.1 mole per mole of sulfide, will generally increase the brightness somewhat.

The mixture is then fired by being moved at a rate of about an inch per minute through a six-foot silica tube, three inches in diameter with a quater-inch wall, and heated over its middle section, for a length of about four feet, to a temperature of about 1720° C. The mixture passes through the tube in trays six inches long, two inches wide and one and one half inches deep. One end of the silica tube is left open, and the trays are fed into that end; the other end is closed by an air lock with a sliding gate at each end to avoid disturbing the flow of inert gas through the tube when trays are removed. The gas enters the tube through a pipe at the closed end and flows in a direction opposite to that of the movement of the trays.

The luminescence will generally be improved if the phosphor cake formed by the firing is crushed, thoroughly mixed and then fired again in the same manner.

The fired phosphor is then lightly crushed to break down large aggregates and to separate its particles and is boiled with a hot 5% aqueous solution of acetic acid, dissolving away most of the free zinc oxide. The mixture is filtered and washed on the filter with two portions of an aqueous ½% acetic acid solution, and then washed twice with distilled water.

Mixing a small amount of zinc chloride with the zinc sulfide, say in the proportions of 0.5% by weight before firing will sometimes improve the light emission. Some of the chloride will be lost on firing with only about 0.01% remaining in the fired mixture. Another chloride than zinc, for example, manganese chloride or ammonium chloride can be used, as long as the proportions are kept within the proper limits.

The manganese can be added in other forms, for example, as the oxide, a compound reducible to the oxide on heating, the chloride, and the like. The manganese content is preferably kept within the range of 0.001 to 0.03 gram-atoms of manganese per mole of zinc sulfide. Part or all of the zinc sulfide can be replaced by the selenide, if desired. A combination of the two can help to increase the local field strength at certain points in the crystal. The phosphor particles can be about 10 microns in dimension, and the phosphor layer can have a thickness of many particles.

The conductive coating 2 on glass plate 1 can be one of those known in the art, and may be applied for example, by exposing the heated glass to vapors of silicon, tin or titanium chlorides, and afterwards placing it in a slightly reducing atmosphere. In some cases, stannic chloride is mixed with absolute alcohol and glacial acetic acid and the glass plate to be coated dipped into it, if the application by vapors is not convenient.

Whether applied by vapor, dipping or otherwise, the resulting coating appears to contain stannic (or silicic or titanic) oxide, probably to some extent at least reduced to a form lower than the dioxide, although the exact composition is not fully known.

The metal layer 4 may be applied as a foil, a conductive metal paint, or may be vacuum-evaporated onto the coating 3, taking care however, not to let the metal get far enough into the phosphor coating 3 to short circuit the device.

It is important that the conductive layers 2 and 4 be in good electrical contact with the phosphor layer 3. For this reason, the metal backing layer 4 should be pressed tightly enough to extend through the phosphor layer 3 at any point and short-circuit to the conductive coating 2.

Plastic material 6 may be molded around the back of the device, being sealed to the glass plate 1, preferably at the edges of the latter as shown. The plastic is preferably sealed under pressure, and may be a thermosetting material such as the usual phenolic or melamine resins, some of the plastic extending to the front of the glass plate 1 around the edges thereof as shown, to clamp the various pieces 1, 2, 3 and 4 together under sufficient pressure to secure good contact.

The phosphor layer may be a few-thousandths of an inch, say 0.004 inch thick, which with about 10,000 volts across it, would correspond to an average field of about $10^6$ volts/cm.

In providing the phosphor layer 3, the phosphor powder can be spread out over glass plate 1 and conductive coating 2, with a mask placed over the area which the layer is not to occupy, and pressure applied to compress the powder, the pressures applied being as high as possible without breaking the glass. The phosphor layer itself, when not limited by the type of glass used, can be compressed at least as high as 9,000 pounds per square inch.

The phosphor layer 3 should extend beyond the edges of the conductive coating 2 and the metal backing 4, in order to make the leakage path between the two conductors 3, 4, as long as necessary to prevent flashover. The phosphor layer can extend an eighth inch or more beyond the conductors 3, 4, for convenience. In some cases a thin insulating layer 5, for example, of mica, is placed over the metal layer 4, to protect the phosphor layer 3 for a distance of say one-eighth inch or so beyond the metal layer, to prevent harm to the phosphor layer in that region when the plastic 6 is applied. The phosphor layer 3 extends beyond the mica layer and is preferably rounded off at its edges.

The field in the crystal will differ from the average field between electrodes, because of irregularities in the crystal shape and in the composition of the crystal from point to point. The field in the crystal can be enhanced also by mixing with the phosphor particles in the phosphor layer 3, a small quantity of metal particles, which can be of somewhat the same size as the phosphor particles. Five to ten percent by volume of metal particles will be sufficient, because a larger percentage will be more likely to provide short-circuiting effects between the electrodes or shielding effects for the crystals. Another way in which such ingredients can be provided is by taking a compressed layer of the powdered phosphor and evaporating onto it a very thin metal film, say a micron thick or even less, then ball-milling the phosphor again to break up the layer and provide crystals, part of whose surface is free from metal and part of which has a metal coating. Such an arrangement is especially useful because advantage can be taken of the field at the metal-crystal contact. However, the proportion of partly metal-coated crystals should be kept small enough with respect to the non-coated crystals, or the proportion of coated surface on each crystal should be kept small enough, to prevent short-circuiting of the phosphor layer, by either direct short-circuit or by arcing.

In some cases, the field required may be low enough so that electroluminescence can be obtained from phosphors without many electrons being raised to the conduction band even when phosphor is embedded in a glass dielectric with an extremely high breakdown voltage.

Even with phosphors such as zinc sulfide containing small amounts of chloride (added for example as zinc or ammonium chloride) and of copper and lead, some of which materials may serve to provide electrons to the conduction band, an improvement in efficiency may be obtained at very high fields such as those between $10^6$ and $10^7$ volts/cm.

The phosphor can be used in the powdered layer form described above. To get the full benefit from the increased field, the amount of copper used should be increased above the 0.001 gram-atoms value used per mole of zinc sulfide at lower fields. Copper contents of about 0.01 are desirable. Correspondingly increased lead and chloride contents are also helpful.

In FIGURE 2, a schematic representation of the crystal energy diagram for the phosphor is shown, the abscissae representing distance through the crystal and the ordinates representing energy. The lower band V is the valence band. The type band C is the conduction band, whose levels are normally unfilled, but to which electrons from the valence band can be excited by sufficiently high fields. In between these bands which extend across the entire crystal are the intermediate levels, $I_1$ and $I_2$ which exist only at certain parts in the crystal, generally parts immediately around an activator impurity atom.

When an electron is excited from the valence band V or say the intermediate level $I_1$, to the conduction band C, it can travel some distance along the crystal in that band, losing energy by scattering effects, by collisions with other atoms, and the like. Eventually it may drop back to a lower level, emitting light in the process, but the efficiency of the emission is reduced by the losses.

If, however, the electron from $I_1$ is excited, not all the way to the valence band, but merely to the higher intermediate level $I_2$, it will not travel along the crystal, and will thus avoid losses of energy in collision with other atoms and the like. The process will be one of higher efficiency; the electron will simply be excited from one level in the activator region to another level in the same regions, and the efficiency will accordingly be more nearly comparable with that achieved by excitation of an activator from one level to another by radiation. The field excitation process will still have some dielectric losses, unless D.C. is used, but the conduction losses will be smaller.

Although manganese-activated zinc sulphide is given above as a specific example of a phosphor excitable to an activator level without being excited to the conduction band, other phosphors may be used, for example, tin-activated calcium phosphate or manganese-activated zinc or cadmium silicate. The zinc in the zinc sulphide described can be replaced in whole or in part by cadmium, and the sulphide can be replaced in whole or in part by selenium.

The amount of manganese activation in the sulphides can be much higher than the limit of the preferable range.

Although some improvement in efficiency can be obtained with increased field strength in copper-activated phosphors, or in other phosphors in which electrons travel in the conduction band, if the content of copper or similar activator is increased, the greatest increase in efficiency will be obtained when the phosphor is free from copper and any other materials which facilitate the entry of electrons into the conduction band.

This application is a division of applicant's copending application Serial No. 305,400, filed August 20, 1952, for Electroluminescent Lamps. That application was issued on July 17, 1956, as United States Patent 2,755,406.

What I claim is:

1. The method of making an electroluminescent phosphor which comprises applying a thin metal film onto a powered layer of inorganic phosphor, and then breaking up the layer into particles.

2. The method of making an electroluminescent phosphor which comprises evaporating a thin metal film onto a powdered layer of inorganic phosphor, and breaking up the layer into particles.

3. The method of making an electroluminescent phosphor which comprises applying a thin metal film onto a powdered layer of inorganic phosphor, and then ball-milling the layer to break it up into particles.

(References on following page)

References Cited in the file of this patent

UNITED STATES PATENTS

| | | |
|---|---|---|
| 2,049,765 | Fischer | Aug. 4, 1936 |
| 2,303,576 | Nelson | Dec. 1, 1942 |
| 2,566,349 | Mager | Sept. 4, 1951 |
| 2,624,857 | Mager | Jan. 6, 1953 |
| 2,709,765 | Koller | May 31, 1955 |
| 2,755,400 | Stiles | July 17, 1956 |
| 2,755,406 | Burns | July 17, 1956 |
| 2,857,541 | Etzel | Oct. 21, 1958 |

OTHER REFERENCES

Burns: "Electroluminescence of Insulated Particles," Jour. of Electrochem. Soc., December 1953, vol. 100, No. 12, pp. 572 to 579.